Feb. 28, 1961 E. O. FRYE 2,973,481
ELECTRONIC LIMIT DETECTOR
Filed Feb. 26, 1958

INVENTOR.
EUGENE O. FRYE
BY Marvin Moody
ATTORNEY

United States Patent Office 2,973,481
Patented Feb. 28, 1961

2,973,481
ELECTRONIC LIMIT DETECTOR

Eugene O. Frye, Marion, Iowa, assignor to Collins Radio Company, Cedar Rapids, Iowa, a corporation of Iowa Filed Feb. 26, 1958, Ser. No. 717,784

2 Claims. (Cl. 328—196)

This invention relates generally to electronic switching and more particularly to an electronic switch which will produce an output level indicative of which one of two preselected limits was last exceeded.

The particular circuit to be described herein is especially adaptable for incorporation with sector scan operations wherein it is desirable for a driven shaft to be selectively rotatable between preselected limits. This particular application finds wide usage in, for example, the control of the drive to a radar antenna wherein the antenna is to be swept through a given angular orientation and wherein the extent of the angular excursion is to be variable between preselected limits. A further example of sector scanning might be the selective rotation of a tuning shaft through a given degree of rotation corresponding to high and low tuned frequencies wherein a tuning motor is to be controlled such that it automatically cycles the tuning shaft between the selected high and low limits corresponding to the frequency spectrum to be scanned.

Numerous means have been incorporated in the art to provide this type of automatic scan control for a driven device. Most common perhaps is the incorporation of a mechanical switching arrangement whereby limit switches selectively positioned in accordance with a mechanically driven tripping element effect the desired reverse switching to make possible a continuous scanning operation. Generally, such mechanical switching means require quite elaborate and expensive mechanical design and are necessarily somewhat limited in application.

It is an object, therefore, of this invention to provide a simple electronic limit detector which will produce an output characteristically indicative of which of two preselected limits has been last exceeded and thus electronically replace mechanical limit switch applications.

It is a further object of this invention to provide an electronic switching circuit controlled from an input voltage which varies in accordance with the position of a driven device in such a manner that discrete output levels are obtained which are indicative of whether a preselected high or low limit was last reached. This output is then readily adapted for use to actuate drive motors to cause the driven devices to oscillate or scan between two preselected and adjustable limits.

This invention is featured in the provision of a unique bias development for an electronic bistable switching circuit whereby the conductivity states of the switching circuit may be selectively interchanged as an input voltage varies between preselected high and low limits.

Further objects, features, and advantages of the invention will become apparent from the following description and claims when read in conjunction with the drawings, in which:

Figure 1:
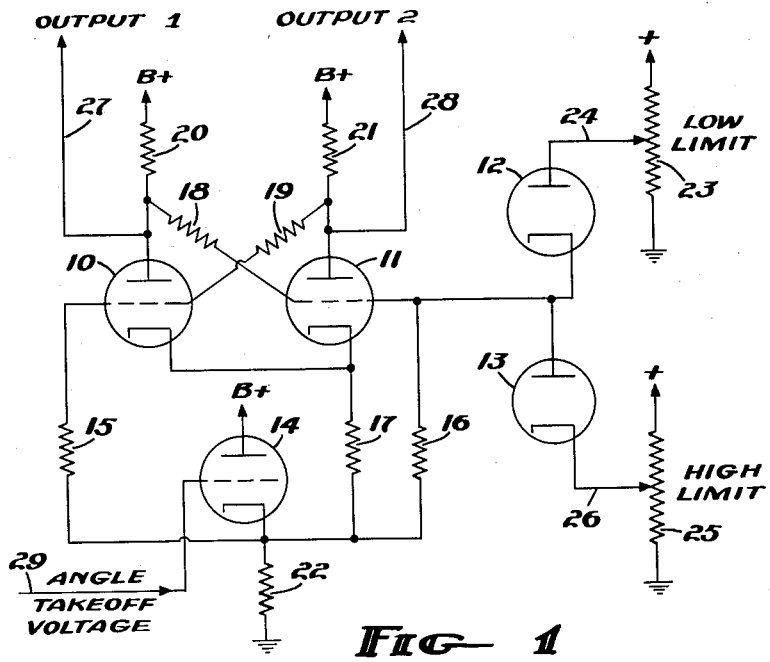
Figure 1 is a schematic diagram of the electronic switch to be discussed.

The limit detector of this invention, as illustrated in Figure 1, compares an angle take-off voltage which might, for example, correspond to the position of a driven shaft with voltages representing desired end limits of the driven shaft position and produces an output voltage that indicates which of the end limits was most recently touched or passed through. Thus the output voltage is digital in form; that is, a "high" output indicates that one limit was last touched and a "low" output indicates that the other limit was last touched. This output can then readily be used to actuate a drive motor or drive motors to cause a drive element or shaft to oscillate or scan between the two adjustable limits.

With reference to Figure 1, vacuum tubes 10 and 11, together with resistors 15, 16, 17, 18, 19, 20 and 21, form a well-known bistable switching circuit commonly known as the Eccles-Jordan type trigger circuit. It should here be noted that, although this invention is described and illustrated as employing vacuum tube triodes in the switch circuit, it is not to be so limited and further that a transistorized circuit might similarly be controlled without departing from the scope of this invention. The grids of vacuum tubes 10 and 11 are returned individually through resistors 15 and 16 and the cathodes of vacuum tubes 10 and 11 are returned in common through a resistor 17 to the cathode of a third vacuum tube 14. Vacuum tube 14 is seen to be a cathode follower whose output voltage is developed between the cathode and ground across cathode resistor 22. An angle take-off voltage (a variable D.C. voltage representing shaft position) is applied to the grid of cathode follower 14. Cathode follower 14 is employed so that the angle take-off voltage applied through connector 29 to the grid of tube 14 is presented to the remaining circuit as a low impedance source. Cathode follower 14 may or may not be necessary depending upon the output impedance of the transducer from which the angle take-off voltage is developed.

As previously discussed, the bistable switching circuit, including vacuum tubes 10 and 11, is of a conventional type wherein, for example, when tube 10 is conducting, tube 11 is virtually cut off and vice versa. A switch circuit of this type is known to inherently exhibit two stable condition wherein there is a great inequality between the plate currents. Such circuits can be used advantageously only when the system can be driven back and forth from one stable position to the other and wherein these reversals may be made under the definite control of some external signal. Unique operation of the circuit of this invention lies in the means by which the switch circuit is triggered from one equilibrium state to the other. It is known that the Eccles-Jordan type of trigger circuit may be triggered by the application of a positive pulse to the grid of the nonconducting tube or of a negative pulse to the grid of the conducting tube. When the grid of either tube is so biased that it tends to reverse its state of conduction, regenerative action takes place in which the conductive states of the two tubes rapidly interchange. Whichever tube is conducting will remain conducting until a bias is so applied that the conductive states are reversed. Thus the circuit "remembers" its last state.

The sector scanning application of the trigger circuit of the present invention is thus attained by selectively controlling the bias on tube 11 as a function of the angle take-off voltage. With reference to Figure 1, a pair of diodes 12 and 13 are connected with opposite polarization between the grid of tube 11 and limit potentiometers 23 and 25 respectively. Diodes 12 and 13 thus in effect compare the angle take-off voltage as produced across resistor 22 of cathode follower 14 with preselected positive voltages as set by the position of wiper arms 24 and 26 on potentiometers 23 and 25 respectively. If the voltage across resistor 22 is less positive than the setting of low limit potentiometer 23, it is seen that diode 12 will conduct. Similarly, if the angle take-off voltage across resistor 22 is more positive than the voltage obtained from the high limit potentiometer 25, diode 13 will conduct. Further, if the angle take-off voltage on resistor 22 is at a level between the high and low limits set by potentiometers 23 and 25, neither diode will conduct. It is to be noted that if either diode is conducting, the grid of tube 11 in the switch circuit is clamped at potential substantially equal to that determined by the associated limit potentiometer arm. It may then be further seen that the bias which controls the conductivity of vacuum tube 11 is developed from a continuous comparison between the angle take-off voltage on resistor 22 and either the high or low limit voltage. During such times that the angle take-off voltage exceeds the high limit or falls below the low limit settings, a controlling bias is developed between the grid and cathode of tube 11.

Assume now that increasing positive angle take-off voltage from connector 29 corresponds to an increasing shaft angle and that tube 11 is cut off with the angle take-off voltage midway between the low and high limits and decreasing. As previously described, for this condition neither of the diodes 12 or 13 is conducting since in neither case does the plate voltage exceed that of the cathode. Having assumed that tube 11 is cut off, the action of resistors 18, 16, 19 and 15 keeps tube 11 cut off and tube 10 conducting. The switch circuit is thus held in this equilibrium state until some outside force influences a reversal. Now considering the angle take-off voltage to have decreased to where the voltage across resistor 22 falls below the low limit voltage from wiper arm 24 of potentiometer 23, diode 12 will conduct since its cathode is now negative with respect to its plate and the grid of tube 11 is thus clamped at a voltage substantially equal to that from wiper arm 24. If the angle take-off voltage then decreases further, the cathode voltage of tube 11 decreases accordingly and, since the grid voltage is held constant, the grid of tube 11 becomes positive with respect to the cathode and tube 11 is forced into conduction. If tube 11 becomes conductive, the previously described regenerative switching action forces tube 11 to conduct heavily and tube 10 cuts off. Now if the angle take-off voltage should go more negative, tube 11 remains conducting. If the angle take-off voltage increases and becomes more positive than the low limit voltage from wiper arm 24, diode 12 ceases to conduct, but tube 11 still remains in a conducting state due to the regenerative cross-coupling between tube 10 and tube 11. If the angle take-off voltage increases to where it becomes more positive than the high limit as determined by the setting of wiper 26 on potentiometer 25, diode 13 conducts and holds the grid of tube 11 at a voltage substantially equal to the high limit potentiometer setting. Now if the angle take-off voltage continues going positive, the grid to cathode voltage of tube 11 goes negative and tends to cut off tube 11. If tube 11 starts to cut off, the regeneratively switching action of the circuit rapidly cuts off tube 11 and forces tube 10 to conduct heavily. Tube 11 then remains cut off and tube 10 conducting until the angle take-off voltage once again goes more negative than the low limit voltage setting as determined by the position of wiper arm 24 of potentiometer 23.

The above action is thus seen to produce distinct conductivity states characteristic of which of the two preselected limits was last exceeded by the angle take-off voltage. Tube 11 will conduct (and tube 10 be cut off) if the angle take-off voltage last crossed the low limit potentiometer setting, and tube 11 will be cut off (and tube 10 conducting) if the angle take-off voltage last crossed the high limit potentiometer setting. This action is seen to be possible by the manner in which the grid voltage of tube 11 of the switch circuit increases in proportion with the cathode voltage between the preselected high and low limits; it being noted that if the angle take-off voltage goes outside the high and low limits, the grid of tube 11 no longer varies with its cathode potential, but rather is clamped at the preselected high and low limits. When this clamping action occurs, the relative voltage between the grid and cathode of tube 11 is seen to vary in the proper manner to alter the conductivity state of tube 11.

The output from the circuit may be taken from the plate of either tube 10 or tube 11 from connectors 27 or 28, or, depending upon the application, may be taken from both if desired; it being noted from the above description that the levels of the plate voltages of tubes 10 and 11 are selectively switched from high to low values characteristic of conductivity states and are uniquely related to the preselected limit last exceeded by the angle take-off voltage input. This binary type of information may then be applied to effect a reversal of a driving motor which positions a driven device.

Figure 2:
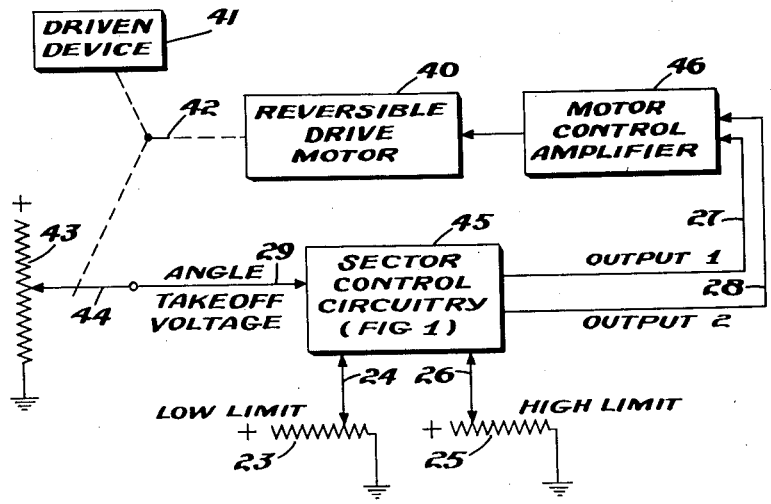
Figure 2 is a functional representation of an embodiment whereby the circuit of Figure 1 may be employed to selectively oscillate a driven device between two adjustable limits.

Figure 2 shows functionally a sector scanning application wherein the electronic switch of Figure 1 may be incorporated to effect the desired drive motor reversal. With reference to Figure 2, it is noted that a reversible drive motor 40 positions a driven device 41 by means of mechanical linkage 42. The position of the driven device 41 is indicated by a varying D.C. voltage taken from an angle take-off potentiometer 43, the wiper arm 44 of which is positioned in accordance with the mechanical drive 42 from the drive motor 40. Angle take-off voltage is taken then from connector 29 and applied to sector control circuitry 45, which is, as illustrated, the limit detecting circuitry of Figure 1. The desired high and low limits may be set in positioning wiper arms 24 and 26 on potentiometers 23 and 25 respectively. Outputs 1 and 2, representing the previously described binary high and low level information, are shown applied to a motor control amplifier 46, which in response to the high and low levels of outputs 1 and 2 may be used to control the rotation of the reversible drive motor 40.

It is thus seen that the invention provides an entirely electronic switching means which incorporates a novel "memory" function and may be used to control the operation of a driven shaft through a preselected sector scanning operation. The electronic switch described is desirable in that it incorporates D.C. coupling wherein only one vacuum tube of the switch circuit will conduct at any one time, thus ensuring that the memory device will always self-recover from temporary malfunctioning due to momentarily "crossing" the limit potentiometers or to certain types of supply voltage transients. In this respect it is noted that to avoid "crossing" the limit potentiometers, means may be employed to ensure that the high limit potentiometer setting at all times exceeds that of the low limit. Since in an actual application the wiper arms 24 and 26 from the high and low limit potentiometers would be controlled by positioning knobs calibrated directly in, for example, frequency or position angles, means might then readily be employed to mechanically ensure that the position of the low limit potentiometer would never exceed that of the high limit potentiometer. This would necessitate a mechanical interlinkage between the two potentiometer shafts which might be realized in any one of a number of known ways.

Although this invention has been described with respect to a particular application thereof wherein a sector scan operation is controlled, it is to be realized that the electronic switch is not limited to such an application and that it might be incorporated otherwise to provide discrete outputs indicative of input voltage variations as described.

What is claimed is:

1. In a switch tube circuit of the type including a pair of electron tubes each having at least a plate, grid and cathode with each plate connected to a supply voltage and each grid cross connected to the plate of the other tube such that the arrangement exhibits two states of equilibrium in which a conductive state may be alternately transferred from one tube to the other; bias control means for switching the equilibrium states comprising means for returning the grids of said pair of tubes individually and the cathodes thereof in common to a junction, means for applying a variable positive D.C. input control signal between said junction and the ground return of said supply voltage, voltage clamping means cooperating with the grid of a first one of said electron tubes to prevent the potential on said grid from falling outside preselected high and low limits, whereby the grid-to-cathode bias potential of said first electron tube is zero when the input signal level is between said preselected high and low limits and becomes positive and negative as the input signal level falls respectively below and above said preselected high and low limits.

2. Bias control means as defined in claim 1 wherein said voltage clamping means comprises first and second sources of direct current voltage, first and second unilateral conduction devices connected in opposite polarization between the grid of said first one of said electron tubes and said first and second sources of positive direct current voltage respectively, said direct current voltage sources being selectively adjustable throughout a range of voltage substantially equal that of said variable positive direct current input control signal as applied between said junction and the ground return of said supply voltage.

References Cited in the file of this patent

UNITED STATES PATENTS

| | | |
|---|---|---|
| 2,588,924 | Hecht | Mar. 11, 1952 |
| 2,824,222 | Furlow | Feb. 18, 1958 |